RECORDING AND PLAYBACK HEAD FOR MAGNETIC SOUND RECORDERS

Filed Sept. 2, 1958

INVENTOR
Richard SIEGEMUND
by Mestern & Kollin,
ATTORNEYS

United States Patent Office 3,067,294

Patented Dec. 4, 1962

3,067,294

RECORDING AND PLAYBACK HEAD FOR MAGNETIC SOUND RECORDERS

Richard Siegemund, St. Georgen, Black Forest, Germany, assignor to Gebr. Steidinger, St. Georgen, Black Forest, Germany, a firm of Germany Filed Sept. 2, 1958, Ser. No. 758,283
Claims priority, application Germany Sept. 6, 1957
4 Claims. (Cl. 179—100.2)

Magnetic sound recorders are based on the principle that sound is transcribed on magnetizable records by means of high-frequency magnetization with the aid of a magnetic head, and picked up and fed to an electronic reproduction means with the aid of another magnetic head. The electrical design conditions for the recording and playback heads are notably different. Thus the playback head ordinarily has an iron circuit which is closed except for the gap associated with the recording medium, and a winding with a reasonably large number of turns to generate the necessary high potential, while the recording head may preferably have an iron circuit with additional air gap and a winding with a smaller number of turns.

To arrive at this result, the known practice is, particularly for magnetic sound recorders of high quality, to provide separate magnetic heads for recording and playback. This arrangement has the disadvantage that the air gaps associated with the recording medium in both heads, and/or their tape-guiding means, must be aligned exactly parallel to each other. Another disadvantage consists in that any replacement of parts subject to wear requires a realignment which can be performed only by specialized personnel. Finally, deformations of the recording medium may lead to unlike position relative to the gaps, with consequent impairment of sound reproduction.

To avoid these disadvantages, and at the same time simplify the equipment, some magnetic sound recorders have the recording and playback circuit united in a single magnetic head. In that case, however, optimum conditions for both recording and playback of course cannot be achieved. Either the available dynamics for reproduction will be appreciably diminished, or the cost of the amplifier and/or high-frequency generator will be substantially increased.

One object of the invention is to avoid the disadvantages of the known devices by suitable combination of at least one movable core part with a stationary core part, associated with the recording means, to provide a variable air gap and hence an iron circuit adjustable to recording or playback.

Another object of the invention is to provide a simple design of magnetic head with two movable core parts to form different gaps.

Still another object of the invention is to provide a simple design of magnetic head with only one movable core part carrying both recording and playback windings and capable of forming different gaps.

The device according to the invention will now be more fully described with reference to the accompanying drawing, but it should be understood that the same is given by way of illustration and not of limitation and that many changes in the details may be made without departing from the spirit of the invention.

Figures 1, 2, 3:
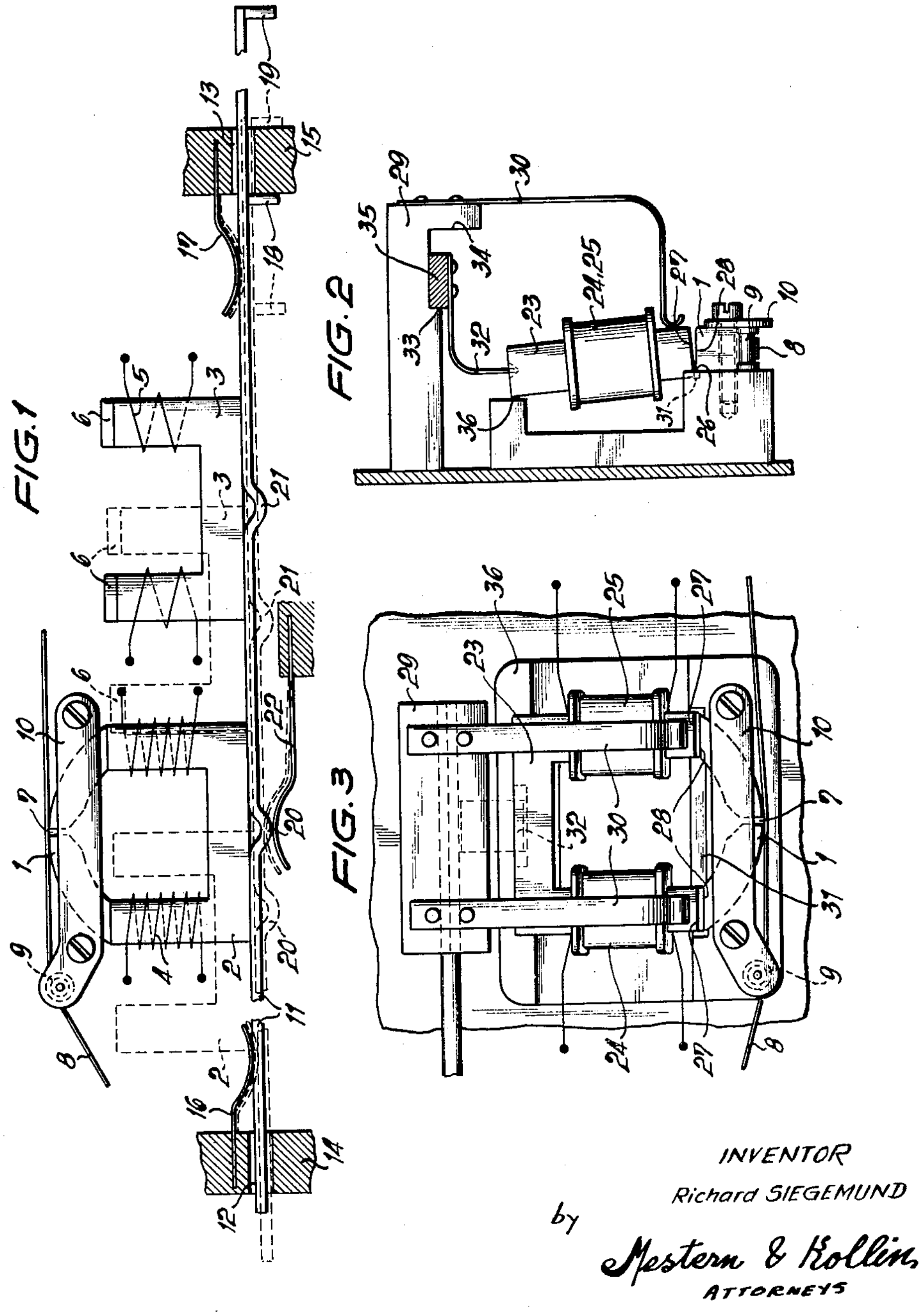
FIG. 1 shows a top view of one embodiment of the invention.
FIG. 2 shows a top view of another embodiment of the invention.
FIG. 3 shows a side view of the embodiment of FIG. 2.

In FIG. 1, the magnetic head is provided with a two-legged head part 1 and two generally V-shaped core parts 2 and 3 of ferromagnetic material, such as iron, displaceable in relation thereto, of which the core part 2 serving adjacent playback carries a winding 4 with a large number of turns, while the core part 3 serving for recording has a winding 5 with a smaller number of turns and two spacers 6 of non-magnetic material.

The head part 1 has a fixed gap 7 for the recording medium 8, which is carried past the head by a system of rollers in known manner not shown. The guide roller 9 at the left of the head is rotatably mounted on a stirrup 10 which at the same time rigidly connects the head part 1 to the chassis of the equipment.

The two core parts 2 and 3 are attached to a bar 11 longitudinally displaceable in openings 12 and 13 in two guide members 14 and 15, only partially shown, fixed relative to the chassis, which bar is held downward against the lower guide surfaces of openings 12 and 13 by two springs 16 and 17.

The bar 11, on either side of the right-hand guide member 15, has two stops 18 and 19 and two downward-directed protuberances 20 and 21 which, in two particular positions, come into engagement with a spring 22 pressing them backward. These two positions are established by contact of the left-hand stop 18 with the left-hand side of the guide member 15, and of the right-hand stop 19 with the right-hand side of guide member 15. In the former position, represented by solid lines in the drawing and corresponding to playback, the core part 2 is precisely opposite head part 1, and spring 22 pressing upon protuberance 20 holds core part 2 indexed in alignment with head part 1, thus forming a gap of virtually zero width.

When bar 11 is shifted to the left, spring 22 becomes inoperative, and the core part 2 is consequently withdrawn from head part 1 by the springs 16 and 17, pressing the bar 11 downward, and will therefore slide to the left without much friction. As soon as the right-hand stop 19 encounters the right-hand side of guide member 15, the right-hand core part 3 lies opposite head part 1. In this position, corresponding to recording, it is held against head part 1 by spring 22 acting on protuberance 21. Now, owing to the presence of the non-magnetic spacers 6, there is a substantially larger gap between the iron cores of head part 1 and core part 3.

By simply sliding bar 11 from one terminal position to the other, therefore, head part 1 can be brought into magnetic engagement with that core part 2 or 3 which is better adapted to the electrical requirements for playback or recording, respectively.

In the embodiment of FIGS. 2 and 3, there is again a head part 1 rigidly attached to the chassis by means of a stirrup 10 and having a gap 7 for the recording medium 8 passing over a roller 9. In this case, however, a single core part 23 with windings 24 and 25 for playback and recording respectively, is provided. It has the edges 26 of its gap surfaces 27 resting on the gap surfaces 28 of the fixed head part 1. It is held by two springs 30 attached to an upright 29 against the stop 31, and in this manner the edges 26 are secured in position relative to the head part.

The top of core part 23 is acted upon by another spring 32 attached to a holder 35 displaceable between two stops 33 and 34 of the upright 29.

In the position represented by solid lines, holder 35 presses core part 23 against a stop 36 by means of spring 32 so that the two gap surfaces 27, 28 are inclined at a definite angle to, and form a wedge-shaped gap with, each other. But if the holder 35 is thrust to the right against stop 34, spring 32 swings core part 23 clockwise until the two gap surfaces 27, 28 are in snug contact and the gap previously present is reduced virtually to zero.

Spring 32 is loaded in the direction of the wedge-shaped gap formed by surfaces 27 and 28, in such manner that it acts as a reversing or toggle spring when holder 35 is shifted. In addition, it will yield parallel to the direction of displacement of holder 35 in such manner that any deviations in the travel of holder 35 are completely compensated. Consequently, in the two positions of the displaceable holder 32, either the core part 23 is securely held against stop 36, thus forming the wedge-shaped gap, or else the core part 23 is tilted until gap surfaces 27, 28 are in mutual contact, thus closing the wedge-shaped gap.

What I claim is:

1. A combined head for the recording and the playback of messages capable of being stored on a magnetizable medium, comprising a fixed core member of ferromagnetic material consisting of two legs with first ends defining an air gap adjacent said medium and second ends spaced apart a distance substantially greater than the width of said gap, movable supplemental core means including at least one generally U-shaped ferromagnetic structure provided with winding means and having a pair of extremities alignable with said second ends for complementing said fixed core member to a substantially closed magnetic circuit, said supplemental core means being displaceable between a first and a second position of alignment, resilient means for urging the extremities of the aligned structure toward said second ends in each of said positions, and counteracting means maintaining said extremities at least partly spaced from said second ends in said first position, said counteracting means being ineffective in said second position whereby the reluctance of said magnetic circuit is less in said second position than in said first position, said magnetic circuit being selectively couplable by said winding means to an electric input circuit and to an electric output circuit.

2. A combined head according to claim 1 wherein said generally U-shaped structure is mounted adjacent said fixed core member for swinging movement relative thereto, said counteracting means including a support for said resilient means displaceable for tilting said structure into a tilted position relatively to said fixed core member, thereby forming wedge-shaped gaps between said extremities and said second ends.

3. A combined head according to claim 1 wherein the number of generally U-shaped ferromagnetic structures alignable with said second ends is two, said counteracting means including non-magnetic spacer means on said extremities of one of said structures, said one of said structures being alignable with said second ends in said first position.

4. A combined head according to claim 3 wherein said winding means comprises a first winding with a relatively low number of turns on said one of said structures and a second winding with a relatively high number of turns on the other of said structures.

References Cited in the file of this patent

UNITED STATES PATENTS

| | | |
|---|---|---|
| 2,360,625 | Walker | Oct. 17, 1944 |
| 2,475,421 | Camras | July 5, 1949 |
| 2,831,180 | Hasbrouck | Apr. 15, 1958 |
| 2,850,581 | Gratian | Sept. 2, 1958 |
| 2,885,489 | Barry | May 5, 1959 |

FOREIGN PATENTS

| | | |
|---|---|---|
| 1,121,583 | France | May 7, 1956 |